United States Patent [19]

Forman

[11] 4,279,469

[45] Jul. 21, 1981

[54] SEPARABLE FIBER OPTIC CABLE CONNECTOR

[75] Inventor: Donald B. Forman, San Diego, Calif.

[73] Assignee: The United States of America as represented by the Secretary of the Navy, Washington, D.C.

[21] Appl. No.: 838,696

[22] Filed: Oct. 3, 1977

Related U.S. Application Data

[63] Continuation-in-part of Ser. No. 581,310, May 27, 1975, abandoned.

[51] Int. Cl.³ .............................................. G02B 5/16
[52] U.S. Cl. ................................................... 350/96.22
[58] Field of Search ............. 350/96.20, 96.21, 96.22; 339/9 R, 9 E, 64 R, 64 M, 205

[56] References Cited

U.S. PATENT DOCUMENTS

| | | | |
|---|---|---|---|
| 2,396,725 | 3/1946 | Thomas, Jr. | 339/205 X |
| 2,567,036 | 9/1951 | Shannon | 350/96.20 |
| 2,615,949 | 10/1952 | Hecking | 339/64 R |
| 3,813,514 | 5/1974 | Canty | 350/96.20 |
| 3,904,269 | 9/1975 | Lebduska et al. | 350/96.22 |
| 3,948,582 | 4/1976 | Martin | 350/96.21 |
| 3,954,338 | 5/1976 | Hennel et al. | 350/96.21 |
| 3,963,232 | 6/1976 | Arnold | 350/96.22 |
| 3,982,806 | 9/1976 | Wilson et al. | 339/64 R |
| 3,990,779 | 11/1976 | McCartney | 350/96.21 |
| 4,060,309 | 11/1977 | LeNoane et al. | 350/96.20 |

OTHER PUBLICATIONS

F. L. Thiel, R. E. Love, and R. L. Smith, "In Line Connectors for Multimode Optical Waveguide Bundles", Applied Optics, vol. 13, No. 2, Feb. 1974, pp. 240–242.

*Primary Examiner*—Stewart J. Levy
*Attorney, Agent, or Firm*—Richard S. Sciascia; Ervin F. Johnston

[57] ABSTRACT

A separable connector is provided for optically joining one or more pairs of fiber optic cable terminals, each of which pairs is supported within a respective rigid alignment sleeve mounted within the connector in a resilient collar so that the alignment sleeves can be individually longitudinal withdrawn from the collar to allow cleaning of the cable faces; the terminal ends of each pair of cables being maintained in a closely spaced, single air-to-glass optical junction.

14 Claims, 3 Drawing Figures

SEPARABLE FIBER OPTIC CABLE CONNECTOR

CROSS-REFERENCE TO RELATED APPLICATIONS

This invention is a continuation-in-part of my prior patent application for "Bulkhead Mounted Fiber Optic Cable Connector", Ser. No. 581,310 filed on May 27, 1975, now abandoned.

BACKGROUND OF THE INVENTION

This invention relates to a separable connector for joining optically the respective terminal ends of one or more pairs of glass fiber optic cables, and more particularly to such a connector using a standard multi-pin electrical connector housing in which is mounted a resilient collar for resiliently and independently securing a plurality of rigid alignment sleeves for the respective mating terminals.

In my aforementioned patent application a novel connector was disclosed in which the glass fiber optic cables were terminated within a sleeve-like body having an unobstructed bore with the opposing faces of the terminated cables positioned in closely spaced relationship to provide a single air-to-glass optical junction that minimizes the degradation of light transmission across the junction, while protecting the finely polished glass cable faces from abrasion.

In the present invention the above described novel terminal connection for fiber optic cables is adapted to be utilized in a well known standard multi-pin electrical cable connector housing. Within the housing is mounted a collar made of resilient material having a plurality of longitudinal openings in which is detachably secured a plurality of rigid alignment sleeves, each sleeve adapted to receive the respective terminal ends of a pair glass fiber cables to be optically connected together. The alignment sleeves are resiliently retained within the collar openings, and each sleeve periodically can be individually removed from either side of the connector for cleaning, and for the cleaning of the finely polished faces of the glass fiber cables normally housed therein. The resilient collar also seals the connection between the connector halves and the alignment sleeves.

The alignment sleeves enable precise and rigid alignment of the two cables ends joined therein. The resilient collar permits individual transverse adjustment of the sleeves to enable alignment during the mating of the connector halves Multi-in electrical connectors have been utilized in the past for joining fiber optic cables, such as in U.S. Pat. No. 3,963,323. However, in this patent a resilient sleeve is employed for aligning the respective fiber optic cable terminal ends, and it is probable that any flexing of the cables caused by transverse forces outside the connector will cause a misalignment of the cable terminals, and therefore degrade the transmission quality across the optical junction.

BRIEF DESCRIPTION OF THE DRAWINGS

FIG. 3 is a further enlarged portion of the section of FIG. 2 showing the air-to-glass junction of FIG. 2.

DESCRIPTION OF THE PREFERRED EMBODIMENT

Figure 1:
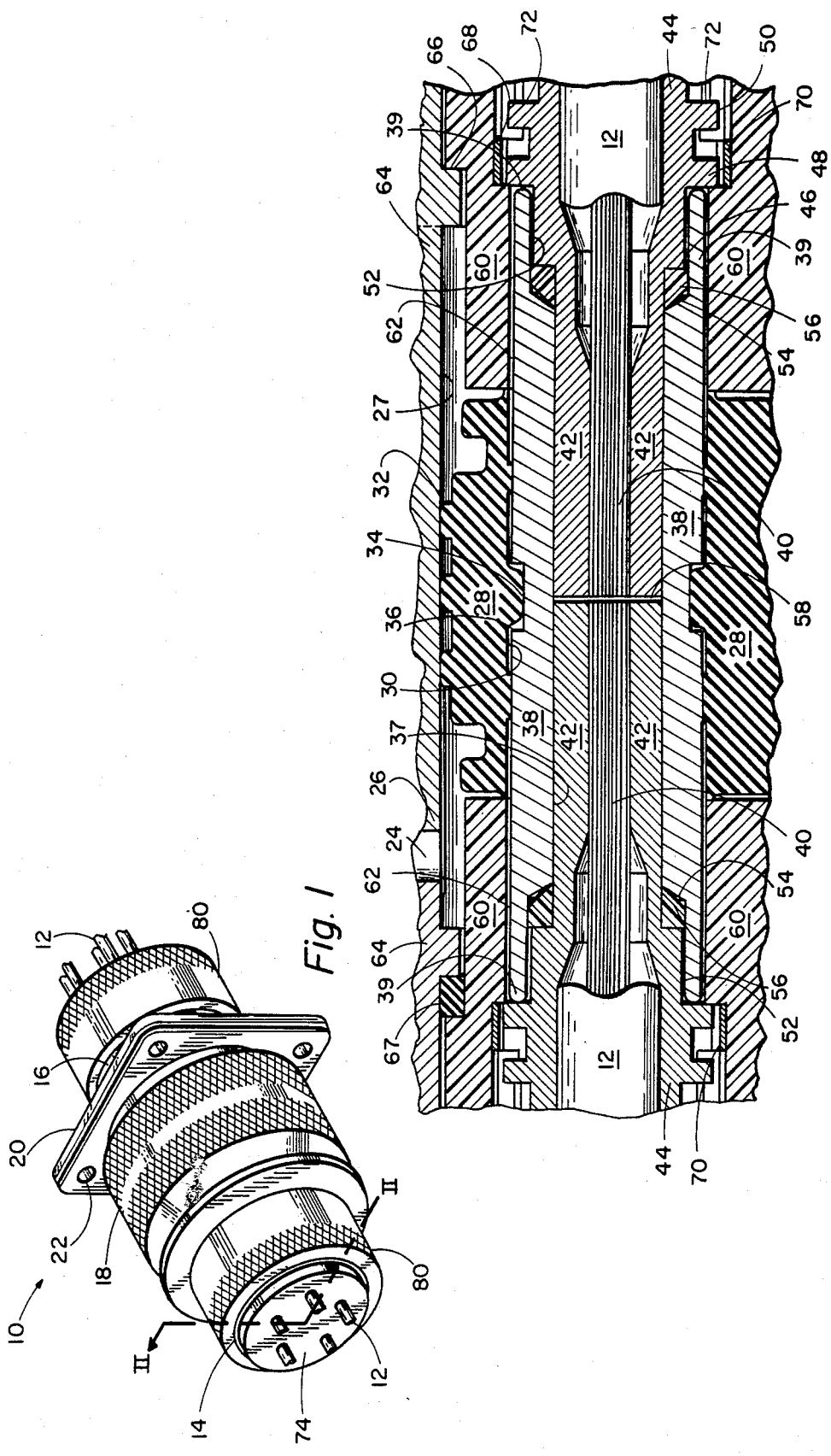
FIG. 1 is a perspective view of an assembled separable fiber optic cable connector of this invention designed to accommodate five pairs of such cables.
Figure 2:
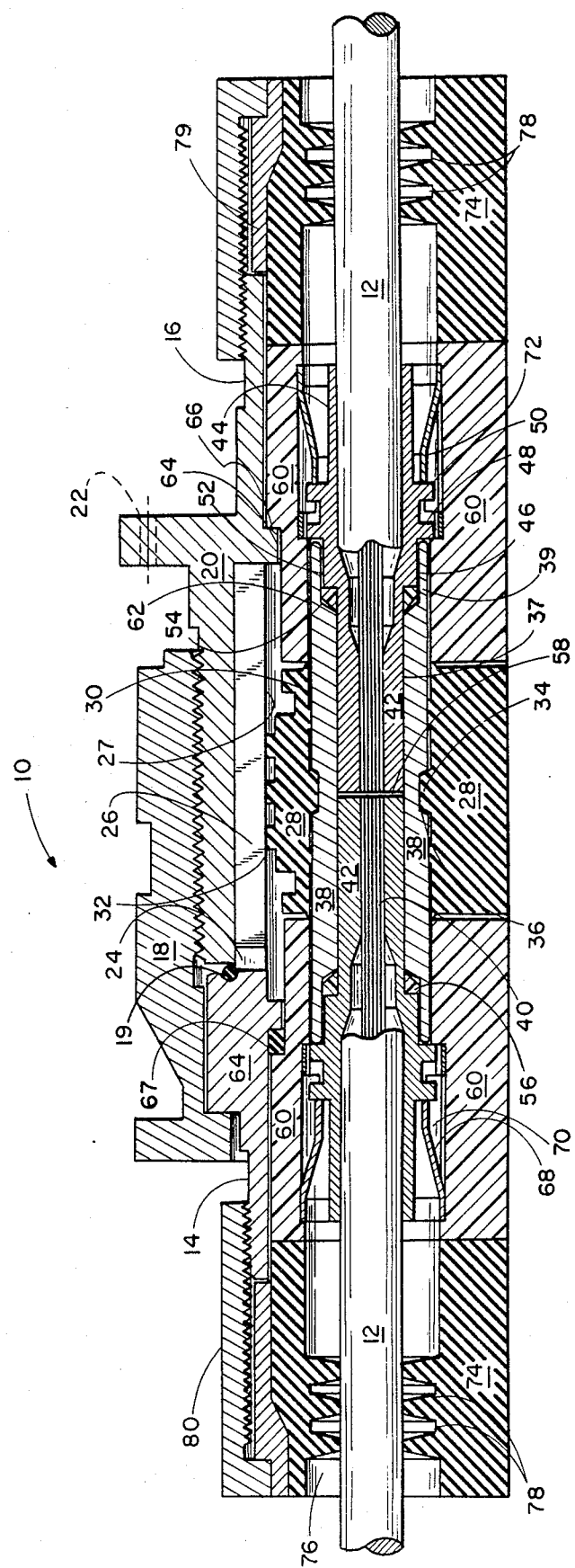
FIG. 2 is an enlarged partial longitudinal section taken along line II—II of FIG. 1.

Referring to the drawings where like reference numerals refer to similar parts throughout the figures there is shown in FIG. 1 a a conventional multi-pin electrical separable connector 10 for joining together a plurality of cables, such fiber optic glass cables 12, a five cable connector being illustrated. Connector 10 comprises a male connector half 14 and a female half 16 threadedly secured together by coupling nut 18. As best shown in FIG. 2, the inner face of male connector half 14 seats an O-ring 19 for sealing the threaded connection. Female connector half 16 may be provided with a mounting flange 20 having drilled holes 22 for attachment to a bulkhead, not shown. Male connector half 14 has an internal key way slot 24 adapted to receive a key 26 on female half 16 for maintaining the connector halves in a predetermined aligned position. The above described connector housing parts represent standard components of commercially available electrical connectors, which parts are utilized with the novel internal components of the present invention to connect the ends of fiber optic cables 12.

Bore 27 of male connector half 14 houses a plug-like collar 28 constructed of a soft natural rubber-like material, through which are molded a plurality of longitudinal openings 30, one opening for each pair of fiber optic cables 12 to be optically connected. On the outer periphery of collar 28 is moulded a plurality of spaced annular ribs 32 which serves to seal the connector bore opening, and enables the collar to be resiliently secured within the bore opening of male half 14.

The bore of each collar opening 30 is also provided with an annular rib 34 which is adapted to project into an outer annular recess 36 on each rigid sleeve 38 for resilient retaining the sleeve therein but allowing longitudinal displacement for maintenance.

Sleeve 38, preferably constructed of metal, has a smooth bore 37 for receiving and aligning the respective terminated ends of glass fiber optic cables 12 of each pair to be optically joined. Whereas sleeve 38 rigidly supports together the terminal ends of cables 12, resilient collar 28 enables each sleeve individually to be transversely adjustable to enable the cable terminals to be axially aligned during mating. Collar 28, being resilient, also protects the cable junctions from external shock forces. Each sleeve 38 is longer than collar 28 to provide overhang portions 39 on each side thereof for a purpose to be described.

As best shown in FIG. 3, each bared cable end 40 is cemented within a reduced end portion 42 of a respective metal terminal 44 of the type described in my above-reference patent application. As all terminals are identical, the description of one will suffice for all. Each terminal 44 is provided with spaced annular shoulders 46, 48 and 50. Alignment sleeve 38 has an enlarged bore portion 52 at each end forming a beveled shoulder 54 aligned with terminal shoulder 46 and between which is adapted to be compressed a beveled-sided annular gasket 56 for sealing the joint. Terminal shoulder 48 is adapted to abut the corresponding end of sleeve 38 to limit the inward positioning of the respective terminal. This construction is an important feature of the invention because it has been found that a single air-to-glass optical junction 58 between the respective cable ends of each pair, having a preferred gap of 0.001" to 0.006", depending on the designed machinery tolerances of the components, provides a minimum degradation of light transmission across the junction between the respective optical cable faces. As the cable faces are at all times spaced from each other, the highly polished surfaces remain unscatched during assembly and in use which also reduces degradation of light transmission. Also, as previously stated, the unrestricted sleeve bore enables the connector assembly to be separated readily for periodic cleaning of the sleeve bore and cable faces.

A plug 60, preferably made of rigid plastic material, is press-fitted into the outer bore end 27 of each of the male and female connector halves 14 and 16. Each plug 60 is provided with five longitudinal openings 62 arranged to be aligned with the respective collar openings 30, the inner bore end of each plug 60 receiving and supporting the respective overhang portions 39 of the alignment sleeves. An annular internal shoulder 64 is formed in each connector half bore 27 adapted to engage an annular plug shoulder 66 to limit the inward positioning of the plugs, and to prevent overly compressing resilient collar 28 positioned between the inner ends of plugs 60 when the connector halves are fully mated. An O-ring seal 67 can be positioned shoulders 64 and 66 of either connector half.

Each terminal 44 is retained in a locked-in assembled position within its respective plug opening 60 by a circular spring 68 which is snapped fitted into an enlarged recessed portion 70 of the bore of the respective plug 60. Spring 68 has a plurality of spaced spring fingers 72 having free ends which are biased radially inwardly in the normal relaxed to engaged an aft end of terminal shoulder 50. A suitable tube-like tool (not shown) is available for insertion into the plug to deflect the fingers radially outwardly, freeing the terminal and allowing it to be withdrawn for connector maintenance.

As best seen in FIG. 1 and 2 fiber optic cables 12 are resiliently supported at the entrance to both male and female connector halves 14 and 16, respectively, by cylindrical fittings 74. Like collar 28, fittings 74 can be made of the same resilient material, having five spaced longitudinal openings 76 to permit passage of the cables. The core of each fitting opening is provided with spaced internal ridges 78 that provide a flexible support to and allows the cables to bend without breakage. Resilient fittings 74 are seated within a ring 79, which in turn is secured to each respective connector half by a threaded retainer ring 80.

The present invention provides a multi-cable separable contractor which is simple in construction, low in cost, and offering simplified maintenance. The connector and its internal parts are readily separable and removable to enable cleaning of the finely polished bored ends of the glass fiber ends maintaining an optimum quality of optical transmission across each junction. The cable terminals are resiliently supported in the connector by a flexible collar that allows axially alignment of the terminals during mating of the connector halves, as well as maintaining a sealed connection. The cable terminals are supported in the connector with the bared end faces closely spaced to provide a single space-to-air optical junction having improved coupling efficiency.

Obviously many modifications and variations of the present invention are possible in the light of the above teachings. It is therefore to be understood that within the scope of the appended claims the invention may be practiced otherwise than as specifically described.

What is claimed is:

1. A separable fiber optic connector comprising:
    male and female halves each having a central bore extending therethrough;
    a resilient collar member concentrically secured within said bore portions said collar having at least one longitudinal opening extending therethrough;
    a rigid sleeve member slidably mounted into said collar opening;
    each end of said sleeve member adapted to receive the terminal end of a pair of respective fiber optic cables to be optically aligned together;
    said resilient collar member enabling the rigid sleeve member to be longitudinally displaced from the respective collar opening from either side thereof;
    and means for maintaining said members in longitudinal relation within the connector.

2. The connector of claim 1 wherein said sleeve member is resiliently engaged by the collar member.

3. The connector of claim 1 wherein said sleeve member has a smooth unobstructed central bore portion to receive said fiber optic cable terminal ends, and means are provided for maintaining said cable ends in a closely spaced, single air-to-glass optical junction within the sleeve member.

4. The connector of claim 3 wherein detent means are provided for detachably anchoring said sleeve member within the collar member.

5. The connector of claim 3 wherein the longitudinal bore and outer surfaces of said resilient collar member is provided with one or more spaced ribs.

6. The connector of claim 3 wherein said cable ends are each anchored in a terminal for positioning said cable ends within the respective sleeve member the ends of said sleeve and terminals having respective shoulders for limiting the inward position of the respective terminals to maintain said said spaced optical junction; and an annular gasket positioned between each pair of said shoulders.

7. The connector of claim 3 wherein said optically spaced junction is in the order of 0.001" to 0.006".

8. The connector of claim 2 wherein said sleeve member is longer than the length of the collar and projects beyond both ends thereover.

9. A separable multi-port fiber optic connector for joining a plurality of glass fiber optic cables comprising:
    male and female halves each having a bore portion;
    a collar member made of a single piece of compressible material concentrically positioned within the said bore portions;
    said collar member having a plurality of circumferentially spaced longitudinal openings extending therethrough;
    a rigid sleeve member resiliently secured in each opening and being of a length greater than the length of the collar member and projecting beyond each end of the ferrule member;
    each sleeve member having a smooth uninterrupted central bore portion for receiving in each end one terminal end of a pair of respective fiber optic cables;
    means for limiting the inward positioning of each of said terminal ends within its respective sleeve end so as to maintain said cable ends in a closely spaced single air-to-glass optical junction;
    said collar member enabling said sleeve members to be individually displaced longitudinally from either side thereof.

10. The connector of claim 1 wherein detent means are provided between the circumferential surface of openings in the collar and the outer surface of the respective sleeve members.

11. The connector of claim 9 wherein each of said connector halves is provided with a rigid cylindrical plug member having a plurality of longitudinal openings each capable of receiving and supporting a respective projecting end of the sleeve members.

12. The connector of claim 9 wherein the bore of each end of said sleeve members is provided with an internal recessed shoulder adapted to be abutted by a shoulder on the respective cable terminals for limiting the inward position of the cable ends within the sleeve member; and sealing means positioned between said shoulders.

13. A separable fiber optical connector body member having an unrestricted bore opening extending therethrough;

a pair of terminals having inner ends coextensive with the ends of respective fiber optical cables secured therein for extending into the bore opening to be optically connected together;

said bore opening having an internal shoulder at each end adapted to be abutted by a shoulder on a respective terminal for limiting the inward position of the cable ends within the body member to be in close but spaced relationship in the order of 0.001" to 0.006" to provide a single air-to-glass optical junction between said cable ends within the body member;

annular sealing means positioned between each pair of shoulders; and means for securing said terminals within the connector and compressing the sealing means.

14. The separable fiber optic connector of claim 2 wherein said rigid sleeve member has transverse symmetry.

* * * * *